United States Patent
Yuventi et al.

(10) Patent No.: US 11,973,335 B1
(45) Date of Patent: Apr. 30, 2024

(54) SOLID STATE CIRCUIT BREAKER

(71) Applicants: Jumie Yuventi, Sacramento, CA (US); Bahman Sharifipour, Newington, NH (US); Liyang Zhang, Seattle, WA (US); Bruno Bambaren, Mountain View, CA (US)

(72) Inventors: Jumie Yuventi, Sacramento, CA (US); Bahman Sharifipour, Newington, NH (US); Liyang Zhang, Seattle, WA (US); Bruno Bambaren, Mountain View, CA (US)

(73) Assignee: RENU, INC., Carollton, TX (US)

( * ) Notice: Subject to any disclaimer, the term of this patent is extended or adjusted under 35 U.S.C. 154(b) by 0 days.

(21) Appl. No.: 16/898,962

(22) Filed: Jun. 11, 2020

Related U.S. Application Data

(60) Provisional application No. 62/861,141, filed on Jun. 13, 2019.

(51) Int. Cl.
  *H02H 9/08* (2006.01)
  *H02H 1/00* (2006.01)
  *H02H 3/08* (2006.01)
  *H02H 9/02* (2006.01)

(52) U.S. Cl.
  CPC ............ *H02H 3/08* (2013.01); *H02H 1/0007* (2013.01); *H02H 9/02* (2013.01)

(58) Field of Classification Search
  CPC ........... H02H 3/08; H02H 1/0007; H02H 9/02
  USPC ....................................................... 361/93.9
  See application file for complete search history.

(56) References Cited

U.S. PATENT DOCUMENTS

| | | | | |
|---|---|---|---|---|
| 6,118,676 | A * | 9/2000 | Divan | H02M 5/458 363/34 |
| 6,426,632 | B1 * | 7/2002 | Clunn | G01R 15/183 324/424 |
| 2009/0051557 | A1 * | 2/2009 | Beatty | H01H 9/167 340/639 |
| 2019/0089146 | A1 * | 3/2019 | Li | H02H 7/0822 |

\* cited by examiner

*Primary Examiner* — Jared Fureman
*Assistant Examiner* — Lucy M Thomas
(74) *Attorney, Agent, or Firm* — Haverstock & Owens, A Law Corporation

(57) ABSTRACT

A solid state circuit breaker has both solid state electronics and a physical switch. The solid state circuit breaker facilitates power measuring for end loads connected to a panel board circuit, e.g. receptacles, lighting, etc., over current protection, and disconnection all within one device. The solid state circuit breaker can be used at 100% of its rated capacity as opposed to 80% code-mandated limitation for thermal magnetic circuit breakers. The solid state circuit breaker also can provide power/current data (real-time) without the need of an additional device. The solid state circuit breaker further facilitates electronic, i.e. remote, opening, closing, and current limiting for demand response or load shedding.

14 Claims, 11 Drawing Sheets

| Current State \ Next State | S01A: POWER PATH ON, ENERGY MONITORING OFF (EM is off and consequently MC goes on standby) | S01B: POWER PATH ON, ENERGY MONITORING ON (Power path is on, EM and consequently MC are on) | |
|---|---|---|---|
| S01A: POWER PATH ON, ENERGY MONITORING OFF (EM is off and consequently MC goes on standby) | - | [User remotely turns EM ON] / (MC STANDBY to ON, EM OFF to ON by MC) | |
| S01B: POWER PATH ON, ENERGY MONITORING ON (Power path is on, EM and consequently MC are on) | [User remotely turns EM OFF] / (EM ON of OFF by MC, then MC ON to STANDBY) | - | |
| S02A: CB OFF (Power path and EM are off and MC on standby) | [User remotely or physically turns power path ON] / (MC STANDY to ON if remote event else remain on STANDBY, power path OFF to ON) | - | |
| S03A: DIAGNOSTIC MODE 1 (MC on for diagnostics, but power path and EM are both off) | [User remotely or physically turns power path ON] / (Power path OFF to ON, MC ON to STANDBY) | - | ... |
| S03B: DIAGNOSTIC MODE 2 (MC and EM on for diagnostics, but power path is off) | - | [User remotely or physically turns power path ON] / (Power path OFF to ON) | |
| S04A: SYSTEM ERROR 1 (Power path and EM are on but MC faults out) | - | - | |
| S04B: SYSTEM ERROR 2 (Power path is on, EM is off, and MC faults out) | - | - | |

Fig. 7A

| Current State \ Next State | S02A: CB OFF (Power path and EM are off and MC on standby) | S03A: DIAGNOSTIC MODE 1 (MC on for diagnostics, but power path and EM are both off) |
|---|---|---|
| S01A: POWER PATH ON, ENERGY MONITORING OFF (EM is off and consequently MC goes on standby) | [User physically or remotely turns power path OFF] or [OV/Short Circuit/OC causes trip via hard circuit by FET or IGBT] or [OT causes temperature sensor to turn power path OFF] / (Power path ON to OFF) | - |
| S01B: POWER PATH ON, ENERGY MONITORING ON (Power path is on, EM and consequently MC are on) | [User physically or remotely turns power path OFF] or [OV/Short Circuit/OC causes trip via hard circuit by FET or IGBT] or [OT causes temperature sensor to turn power path OFF] / (Power path ON to OFF) | - |
| S02A: CB OFF (Power path and EM are off and MC on standby) | - | [User remotely turns MC ON] / (MC STANDBY to ON) |
| S03A: DIAGNOSTIC MODE 1 (MC on for diagnostics, but power path and EM are both off) | [User remotely turns MC to STANDBY] / (MC ON to STANDBY) | - |
| S03B: DIAGNOSTIC MODE 2 (MC and EM on for diagnostics, but power path is off) | - | [User remotely turns EM OFF] / (EM OFF to ON by MC) |
| S04A: SYSTEM ERROR 1 (Power path and EM are on but MC faults out) | [User physically turns power path OFF] or [OV/Short Circuit/OC causes trip via hard circuit by FET or IGBT] or [OT causes temperature sensor to turn power path OFF] / (Power path ON to OFF) | - |
| S04B: SYSTEM ERROR 2 (Power path is on, EM is off, and MC faults out) | [User physically turns power path OFF] or [OV/Short Circuit/OC causes trip via hard circuit by FET or IGBT] or [OT causes temperature sensor to turn power path OFF] / (Power path ON to OFF) | - |

Fig. 7B

| Current State \ Next State | S03B: DIAGNOSTIC MODE 2 (MC and EM on for diagnostics, but power path is off) | S04A: SYSTEM ERROR 1 (Power path and EM are on but MC faults out) | S04B: SYSTEM ERROR 2 (Power path is on, EM is off, and MC faults out) |
|---|---|---|---|
| S01A: POWER PATH ON, ENERGY MONITORING OFF (EM is off and consequently MC goes on standby) | - | - | [MC fault] / (MC STANDBY to FAULT) |
| S01B: POWER PATH ON, ENERGY MONITORING ON (Power path is on, EM and consequently MC are on) | - | [MC fault] / (MC ON to FAULT) | - |
| S02A: CB OFF (Power path and EM are off and MC on standby) | - | - | - |
| S03A: DIAGNOSTIC MODE 1 (MC on for diagnostics, but power path and EM are both off) | [User remotely turns EM ON] / (EM OFF to ON by MC) | - | - |
| S03B: DIAGNOSTIC MODE 2 (MC and EM on for diagnostics, but power path is off) | - | - | - |
| S04A: SYSTEM ERROR 1 (Power path and EM are on but MC faults out) | - | - | - |
| S04B: SYSTEM ERROR 2 (Power path is on, EM is off, and MC faults out) | - | - | - |

Fig. 7C

| Current State \ Next State | S01A:<br>POWER PATH ON,<br>ENERGY MONITORING<br>OFF (UNUSED) | S01B:<br>POWER PATH ON,<br>ENERGY MONITORING<br>ON (Power path and<br>transmitter on) | |
|---|---|---|---|
| S01A:<br>POWER PATH ON,<br>ENERGY MONITORING<br>OFF (UNUSED) | - | - | |
| S01B:<br>POWER PATH ON,<br>ENERGY MONITORING<br>ON (Power path and<br>transmitter on) | - | - | |
| S02A:<br>CB OFF<br>(Power path and<br>consequently EM are off<br>and transmitter is off) | - | [User physically turns<br>power path ON] /<br>(Power path OFF to ON) | ... |
| S03A:<br>DIAGNOSTIC MODE 1<br>(Power path and<br>consequently EM are off<br>but transmitter is on for<br>diagnostics) | - | [User physically turns<br>power path ON] /<br>(Power path OFF to ON,<br>EM OFF to ON) | |
| S03B:<br>DIAGNOSTIC MODE 2<br>(UNUSED) | - | - | |
| S04A:<br>SYSTEM ERROR 1<br>(Power path is on but<br>transmitter faults out) | - | - | |
| S04B:<br>SYSTEM ERROR 2<br>(UNUSED) | - | - | |

Fig. 8A

| Current State \ Next State | S02A: CB OFF (Power path and consequently EM are off and transmitter is off) | S03A: DIAGNOSTIC MODE 1 (Power path and consequently EM are off but transmitter is on for diagnostics) |
|---|---|---|
| S01A: POWER PATH ON, ENERGY MONITORING OFF (UNUSED) | - | - |
| S01B: POWER PATH ON, ENERGY MONITORING ON (Power path and transmitter on) | [User physically turns power path OFF] or [OV/Short Circuit/OC causes trip via hard circuit by FET or IGBT] or [OT causes temperature sensor to turn power path OFF] / (Power path ON to OFF) | - |
| S02A: CB OFF (Power path and consequently EM are off and transmitter is off) | - | [User physically turns transmitter ON] / (Transmitter STANDBY to ON) |
| S03A: DIAGNOSTIC MODE 1 (Power path and consequently EM are off but transmitter is on for diagnostics) | [User physically turns transmitter to STANDBY] / (Transmitter ON to STANDBY) | - |
| S03B: DIAGNOSTIC MODE 2 (UNUSED) | - | - |
| S04A: SYSTEM ERROR 1 (Power path is on but transmitter faults out) | [User physically turns power path OFF] or [OV/Short Circuit/OC causes trip via hard circuit by FET or IGBT] or [OT causes temperature sensor to turn power path OFF] / (Power path ON to OFF) | - |
| S04B: SYSTEM ERROR 2 (UNUSED) | - | - |

Fig. 8B

| Current State \ Next State | S03B: DIAGNOSTIC MODE 2 (UNUSED) | S04A: SYSTEM ERROR 1 (Power path is on but transmitter faults out) | S04B: SYSTEM ERROR 2 (UNUSED) |
|---|---|---|---|
| S01A: POWER PATH ON, ENERGY MONITORING OFF (UNUSED) | - | - | - |
| S01B: POWER PATH ON, ENERGY MONITORING ON (Power path and transmitter on) | - | [Transmitter fault] / (Transmitter ON to FAULT) | - |
| S02A: CB OFF (Power path and consequently EM are off and transmitter is off) | - | - | - |
| S03A: DIAGNOSTIC MODE 1 (Power path and consequently EM are off but transmitter is on for diagnostics) | - | - | - |
| S03B: DIAGNOSTIC MODE 2 (UNUSED) | - | - | - |
| S04A: SYSTEM ERROR 1 (Power path is on but transmitter faults out) | - | - | - |
| S04B: SYSTEM ERROR 2 (UNUSED) | - | - | - |

Fig. 8C

SOLID STATE CIRCUIT BREAKER

RELATED APPLICATIONS

This Patent Application claims priority under 35 U.S.C. 119(e) of the U.S. provisional patent application Ser. No. 62/861,141, filed on Jun. 13, 2019, and entitled "Solid State Circuit Breaker", which is hereby incorporated in its entirety by reference.

FIELD OF THE INVENTION

The present invention is generally directed to circuit breakers. More specifically, the present invention is directed to solid state circuit breakers.

BACKGROUND OF THE INVENTION

A circuit breaker is an automatically operated electrical switch designed to protect an electrical circuit from damage caused by excess current from an overload or short circuit. A circuit breaker functions to interrupt current flow after a fault is detected. Such interruption is referred to as tripping the circuit breaker. A circuit breaker can be reset, either manually or automatically, to resume normal operation. Circuit breakers are manufactured in standard sizes, using a system of preferred numbers to cover a range of ratings. The rated current of a circuit breaker for low voltage distribution applications is the maximum current that the circuit breaker is designed to carry continuously (at an ambient air temperature of 30° C.). When current exceeds the maximum rating, the circuit breaker trips.

A circuit breaker operates by first detecting a fault condition. In low voltage circuit breakers, this is usually done within the device itself. Once a fault is detected, contacts within the circuit are open to interrupt the circuit; this is commonly done using mechanically stored energy contained within the breaker, such as a spring or compressed air to separate the contacts.

Typical circuit breakers also utilize the heating or magnetic effects of electric current. Magnetic circuit breakers use a solenoid (electromagnet) whose pulling force increases with the current. A basic magnetic circuit breaker consists of a simple switch having a stationary contact and a moving contact connected to a movable switch, or lever. A hot wire in the circuit connects to two terminals of the circuit breaker. When the switch is flipped to the ON position, electricity can flow from a first terminal, through the electromagnet, to the moving contact, across to the stationary contact and out to the second terminal. The current magnetizes the electromagnet. Increasing current boosts the electromagnet's magnetic force, and decreasing current lowers the magnetism. When the current increases to unsafe levels, e.g. above the rated current, the electromagnet is strong enough to pull down a metal lever connected to the switch linkage. The entire linkage shifts, tilting the moving contact away from the stationary contact to break the circuit. The electricity shuts off.

A bimetallic strip design works on the same principle, except that instead of energizing an electromagnet, the high current bends a thin strip to move the switch linkage. Thermal magnetic circuit breakers incorporate both heating or magnetic techniques with the electromagnet responding instantaneously to large surges in current (short circuits) and the bimetallic strip responding to less extreme but longer-term over-current conditions. The thermal portion of the circuit breaker provides a time response feature, that trips the circuit breaker sooner for larger over currents but allows smaller overloads to persist for a longer time. This allows short current spikes such as are produced when a motor or other non-resistive load is switched on. With very large over-currents during a short-circuit, the magnetic element trips the circuit breaker with no intentional additional delay. In practice, thermal magnetic circuit breakers are implemented at only 80% of their rated capacity due to building code requirements to prevent false tripping due to heating. As such, where a circuit design calls for 40 A, a thermal magnetic circuit breaker rated at 50 A must be used.

Solid-state circuit breakers, also known as digital circuit breakers, use electronic components such as semiconductor devices to monitor current levels rather than electro-mechanical devices. These electronic components are more precise and they shut down the circuit more quickly, but they are also more expensive.

SUMMARY OF THE INVENTION

Embodiments are directed to a solid state circuit breaker having a physical switch. The solid state circuit breaker facilitates power measuring for end loads connected to a panelboard circuit, e.g. receptacles, lighting, etc., over current protection, and disconnection all within one device. The solid state circuit breaker can be used at 100% of its rated capacity as opposed to 80% code-mandated limitation for thermal magnetic circuit breakers, i.e. where a 50 A thermal magnetic circuit breaker is normally used, a 40 A solid state circuit breaker of the type described herein can be used. This will allow for 25% more load or lowering the total number of circuit breakers needed for an area, in-turn potentially reducing the quantity or physical size of panel boards. The solid state circuit breaker also can provide power/current data (real-time) without the need of an additional device. In contrast, split-core current transformers or inline sensors are needed to get this data from thermal magnetic circuit breakers. The solid state circuit breaker further facilitates electronic, i.e. remote, opening, closing, and current limiting for demand response or load shedding.

In an aspect, a solid state circuit breaker including a first terminal to receive an AC voltage and a second terminal to output the AC voltage is disclosed. The solid state circuit breaker comprises a current limiting circuit coupled to the first terminal, a coupled transistor pair coupled between the first terminal and the second terminal, a driver circuit coupled to the transistor pair, a sensing circuit coupled to the first terminal, the second terminal, and the driver circuit, and a controller circuit coupled to the first terminal, the second terminal, and the current limiting circuit. The sensing circuit is configured to sense a first voltage characteristic at the first terminal, to sense a second voltage characteristic at the second terminal, and to supply the first voltage characteristic and the second voltage characteristic to the driver circuit. The driver circuit is configured to turn OFF the transistor pair in response to first voltage characteristic being outside a first acceptable range or the second voltage characteristic being outside a second acceptable range. The controller circuit is configured to determine a voltage difference between an input voltage at the first terminal and an output voltage at the second terminal and in response to the voltage difference being outside a third acceptable range generating a trip signal sent to the current limiting circuit. The current limiting circuit shunts current from the sensing circuit in response to receiving the trip signal thereby changing the first voltage characteristic to be outside the first acceptable range such that the driver circuit turns OFF the transistor pair. In some embodiments, the controller circuit, the current limiting circuit, the sensing circuit, and the driver circuit provide a first mechanism for turning OFF the transistor pair in response to a fault condition. In some embodiments, the sensing circuit and the driver circuit provide a second mechanism independent of the current limiting circuit and the controller circuit for turning OFF the transistor pair in response to the fault condition. In some embodiments, the first mechanism and the second mechanism provide redundancy for turning OFF the transistor pair in response to the fault condition. In some embodiments, the current limiting circuit comprises a triac controlled by the trip signal. In some embodiments, the sensing circuit comprises a first comparator coupled to the first terminal and configured to output a first voltage difference corresponding to the first voltage characteristic, and a second comparator coupled to the second terminal and configured to output a second voltage difference corresponding to the second voltage characteristic. In some embodiments, the controller circuit is further configured to receive as input a remote control signal for turning OFF the solid state circuit breaker, further wherein the controller circuit is configured to generate the trip signal in response to the remote control signal. In some embodiments, a first transistor of the transistor pair is configured to enable current flow from the first terminal to the second terminal during a positive half-cycle of the AC voltage, and a second transistor of the transistor pair is configured to enable current flow from the first terminal to the second terminal during a negative half-cycle of the AC voltage.

In another aspect, a circuit breaker including a first terminal to receive an AC voltage and a second terminal to output the AC voltage is disclosed. The circuit breaker comprises an electro-mechanical switch, a solid state circuit breaker, and a controller circuit. The electro-mechanical switch is coupled to the first terminal to receive the AC voltage. The electro-mechanical switch includes a physical switch that moves between an open position and a closed position and an actuator for moving the physical switch between the open position and the closed position. The solid state circuit breaker is coupled to the electro-mechanical switch to receive the AC voltage. The solid state circuit breaker comprises a coupled transistor pair and a sensing circuit coupled to the transistor pair, wherein the sensing circuit is configured to turn OFF the transistor pair in response to receiving a trip signal. The controller circuit is coupled to an input and an output of the solid state circuit breaker. The controller circuit is configured to determine a fault condition at either the input or the output of the solid state circuit breaker and in response to the fault condition generating the trip signal and sending the trip signal to the solid state circuit breaker and to the actuator. The physical switch is moved to the open position by the actuator in response to the actuator receiving the trip signal. In some embodiments, the solid state circuit breaker comprises: a current limiting circuit activated by the trip signal; the coupled transistor pair coupled to the current limiting circuit; a driver circuit coupled to the transistor pair; and the sensing circuit coupled to the current limiting circuit and the driver circuit, wherein the sensing circuit is configured to sense a voltage drop in response to activation of the current limiting circuit, further wherein the driver circuit is configured to turn OFF the transistor pair in response to the sensed voltage drop. In some embodiments, the controller circuit is further coupled to the current limiting circuit, further wherein the current limiting circuit shunts current in response to receiving the trip signal thereby resulting in the voltage drop sensed by the sensing circuit. In some embodiments, the sensing circuit is further configured to sense the fault condition at either the input or the output of the solid state circuit breaker and to supply the fault condition to the driver circuit. In some embodiments, the controller circuit, the current limiting circuit, the sensing circuit, and the driver circuit provide a first mechanism for turning OFF the transistor pair in response to a fault condition. In some embodiments, the sensing circuit and the driver circuit provide a second mechanism independent of the current limiting circuit and the controller circuit for turning OFF the transistor pair in response to the fault condition. In some embodiments, the first mechanism and the second mechanism provide redundancy within the solid state circuit breaker for turning OFF the transistor pair in response to the fault condition. In some embodiments, the current limiting circuit comprises a triac controlled by the trip signal. In some embodiments, the electro-mechanical switch and the solid state circuit breaker provide redundancy within the circuit breaker for turning OFF current flow through the circuit breaker in response to the fault condition. In some embodiments, the sensing circuit comprises a first comparator coupled to the first terminal and configured to output a first voltage difference corresponding to the first voltage characteristic, and a second comparator coupled to the second terminal and configured to output a second voltage difference corresponding to the second voltage characteristic. In some embodiments, the controller circuit is further configured to receive as input a remote control signal for turning OFF the solid state circuit breaker, further wherein the controller circuit is configured to generate the trip signal in response to the remote control signal. In some embodiments, a first transistor of the transistor pair is configured to enable current flow from the first terminal to the second terminal during a positive half-cycle of the AC voltage, and a second transistor of the transistor pair is configured to enable current flow from the first terminal to the second terminal during a negative half-cycle of the AC voltage.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures:

FIGS. 7A-7C illustrates a state transition table according to some embodiments.

FIGS. 8A-8C illustrates another state transition table according to some embodiments.

DETAILED DESCRIPTION OF THE EMBODIMENTS

Embodiments of the present application are directed to a solid state circuit breaker. Those of ordinary skill in the art will realize that the following detailed description of the solid state circuit breaker is illustrative only and is not intended to be in any way limiting. Other embodiments of the solid state circuit breaker will readily suggest themselves to such skilled persons having the benefit of this disclosure.

Reference will now be made in detail to implementations of the solid state circuit breaker as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The solid state circuit breaker can be implemented as either a mid-frame breaker, also referred to as a feeder breaker or a main circuit breaker, or a small-frame breaker, also referred to as a branch circuit breaker. In the case of a mid-frame breaker, the solid state circuit breaker can be implemented within a main switch board that is configured to distribute power from an input main line power source to one or more branch circuits. Typical branch circuits are designed for loads in the range of 125-600 A (ampere). In the case of a small-frame breaker, the solid state circuit breaker can be implemented in a panel board that is configured to distribute power to a plurality of end loads. Typical small-frame breakers are designed for loads under 100 A. In either type of implementation, the solid state circuit breaker is capable of operating at 100% of its rated capacity for continuous load. Additionally, the solid state circuit breaker is configured to measure power for end loads, and to provide over current protection, and electronic disconnection (tripping) of the circuit all within a single device. As used herein, the term "trip" or "tripping" refers to creating an open circuit in the solid state circuit breaker that prevents current flow from an input to an output of the solid state circuit breaker.

Figure 1:
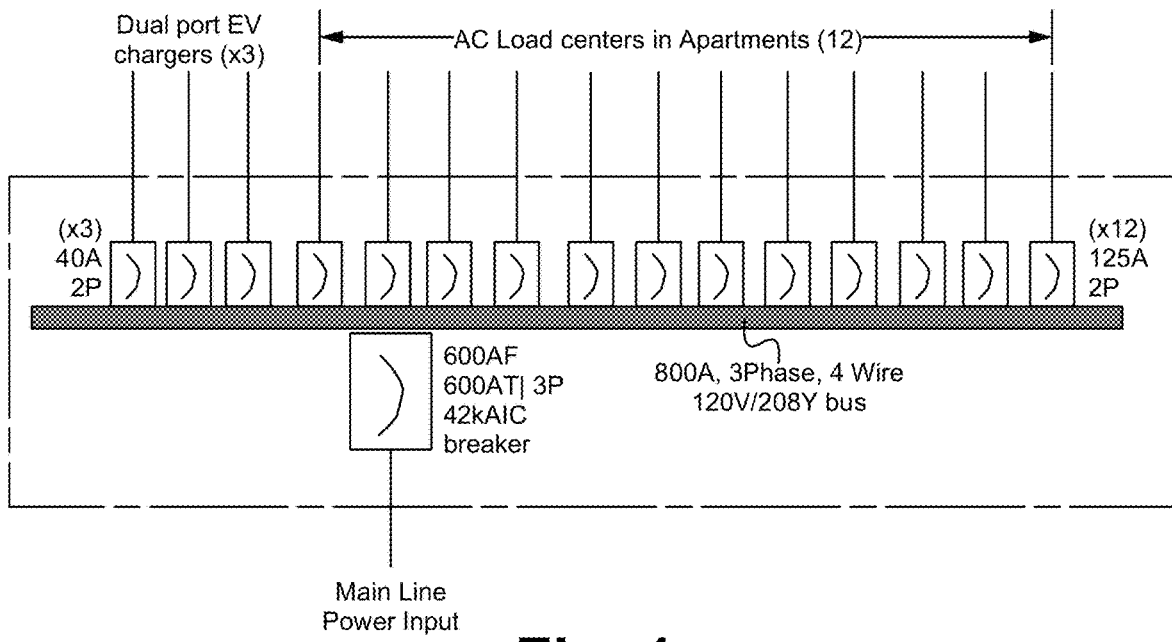
FIG. 1 illustrates a functional block diagram of a main switch board according to some embodiments.

FIG. 1 illustrates a functional block diagram of a main switch board according to some embodiments. The main switch board receives input power from a main line power distribution network, such as power provided by a local utility power company. The main switch board includes a main line conductor bus that interconnects the main line power input to a plurality of branch circuits. In an exemplary application, the main switch board is implemented within an apartment building and is configured to supply power to twelve separate apartment units. Each apartment unit is supplied power from the main switch board via a branch circuit. A solid state circuit breaker is connected between the main line conductor bus and each branch circuit. In the exemplary application, each solid state circuit breaker connected to a branch circuit is 125 A. It is understood that different sized solid state circuit breakers can be used, which are configured according to the intended power to be supplied to each branch circuit. In some embodiments, additional branch circuits can be connected to the main line conductor bus, for example branch circuits for connecting to dual port EV charger where 40 A solid state circuit breakers are implemented. It is understood that the main switch board can include more or less branch circuit connections, and that more or less power with correspondingly sized solid state circuit breakers can be supplied to the branch circuits according to the intended loads.

Figure 2:
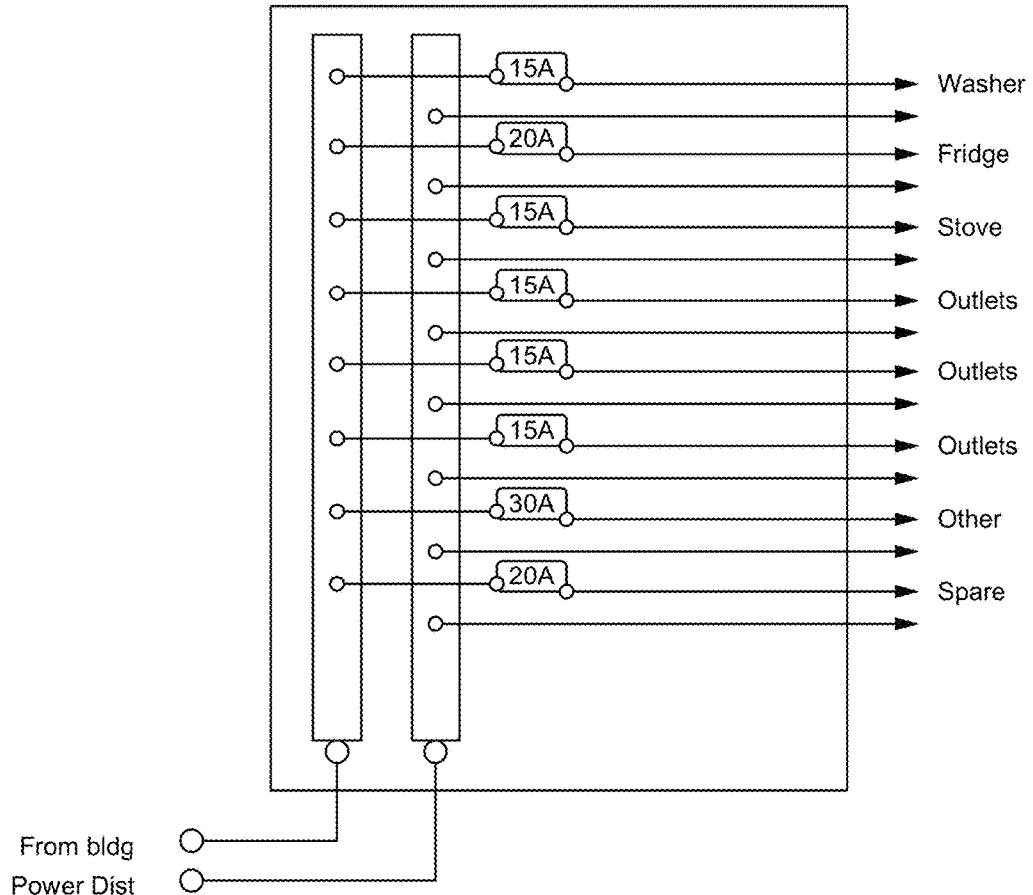
FIG. 2 illustrates a functional block diagram of a panel board according to some embodiments.

FIG. 2 illustrates a functional block diagram of a panel board according to some embodiments. In some embodiments, the panel board receives input power from a building power distribution network, such as power output from the main switch board shown in FIG. 1. In other embodiments, the panel board receives input power from a main line power source, such as the case for a single family residence. The panel board includes a live conductor bus (L) and a neutral conductor bus (N). A solid state circuit breaker is connected between the live conductor bus and the output load, such as a washer, a refrigerator, a stove, outlets, and the like. Depending on the load, different sized solid state circuit breaker are used. For example, a 15 A solid state circuit breaker is connected to the washer and the outlets, and a 20 A solid state circuit breaker is connected to the refrigerator. It is understood that the panel board can be alternatively configured with more or less connections to output loads, with different sizes than those shown.

Figure 3:
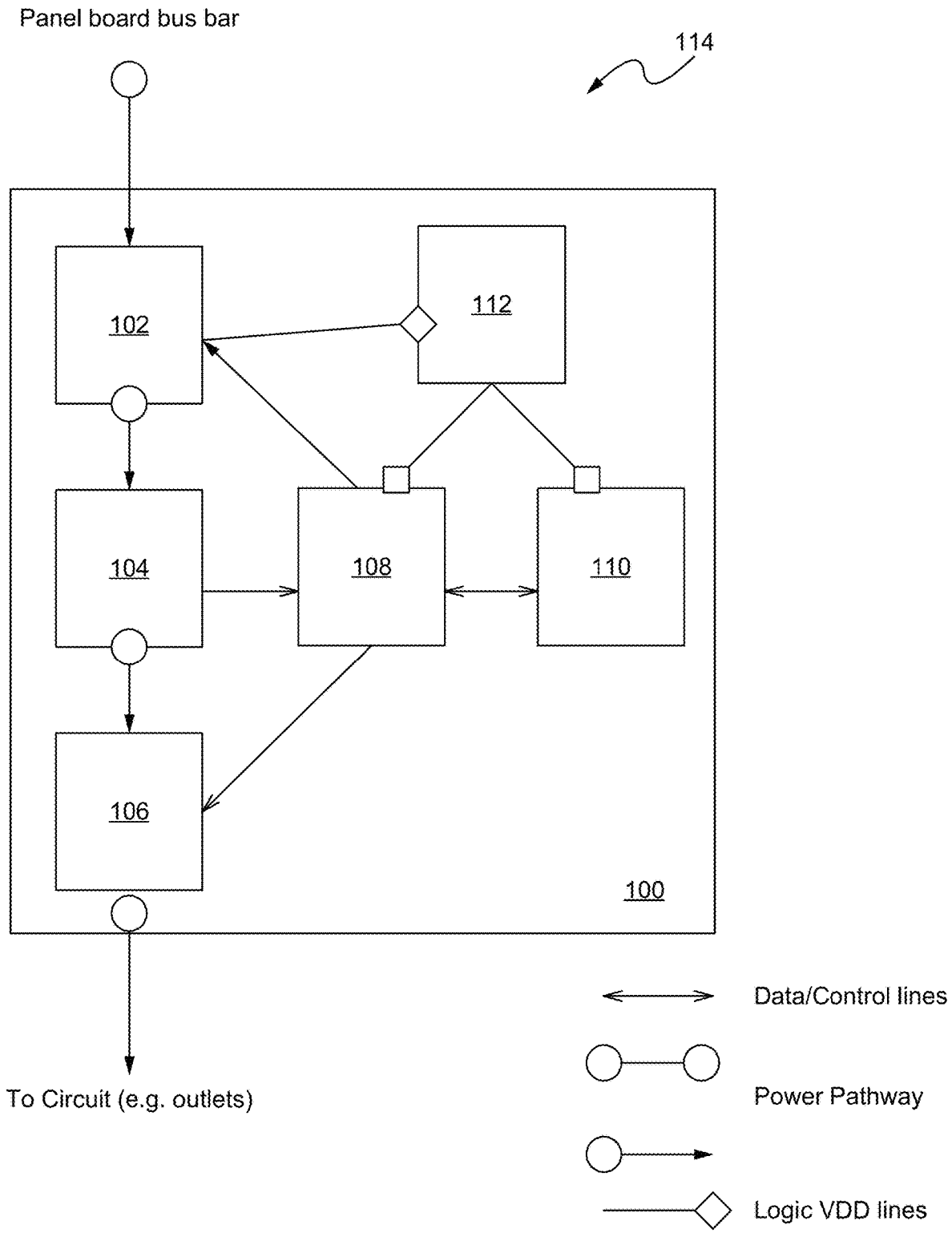
FIG. 3 illustrates a functional block diagram of a solid state circuit breaker according to some embodiments.

FIG. 3 illustrates a functional block diagram of a solid state circuit breaker according to some embodiments. The solid state circuit breaker 114 is shown in an exemplary implementation as a small-frame breaker, for example connecting a panel board bus bar to an end load, such as an outlet. It is understood that the solid state circuit breaker can be similarly configured and implemented as a mid-frame breaker. The solid state circuit breaker 114 includes an enclosure 100, a physical toggle switch 102, a current sensing circuit 104, a current limiting circuit 106, a controller 108, a data transceiver 110, and a voltage converter 112. In some embodiments, the enclosure 100 is a molded casing. The toggle switch 102 physically opens ("trips") and closes the circuit connecting the panel board bus bar and the end load, thereby enabling power input into the solid state circuit breaker 114 to by output to the end load. In some embodiments, the toggle switch 102 includes a physical switch comprising a movable switching arm that pivots into open and closed position against contact points, and a physical lever mechanically connected to and moving in conjunction with the movable switching arm. The physical switch can be controlled manually by an operator physically flipping the lever and can be controlled by the controller 108 via electrical control. The current sensing circuit 104 includes circuitry, such as transistors, operational amplifiers, resistors, inductors, capacitors, etc., for sensing current conditions. In some embodiments, the current sensing circuit 104 also includes voltage sensing circuitry for power (energy) monitoring. In some embodiments, the transistors are IGBTs (insulated gate bipolar transistors). In other embodiments, the transistors are FETs (field effect transistors). It is understood that other types of transistors can be used. The current limiting circuit 106 includes circuitry, such as triac and resistors, for limiting current flow. The data transceiver 110 is configured to transmit and receive data. The data transceiver 110 can be configured for hardwired or wireless transmission to a local collector, external to the solid state circuit breaker 114, that is connected to the internet (via 802.11, etc.) or other communication network. The controller 108 includes programmable logic and circuitry, such as a microcontroller unit (MCU), a central processing unit (CPU), or the like, memory, transistor drivers, and other circuitry for determining the controlling function of the toggle switch 102 and the current limiting circuit 106. The controller 108 determines control signaling according to sensed data, programmed limits, and external input from the data transceiver 110. The controller 108 can also send select data (energy monitoring data) via the data transceiver 110. The energy monitoring functionality can be used by a remote device/user to determine actions to be taken, for example turning the solid state circuit breaker ON or OFF, also referred to as turning the power path ON or OFF. Sending actionable signaling from the remote device/user to the controller 108 can be implemented by remote control signaling. In those configurations that do not include remote control functionality, the receiver may not be included within the data transceiver 110 and corresponding control circuitry and programming for processing such received remote control signaling may not be included in the controller 108. The voltage converter 112 is configured to convert input voltage, such as input voltage from the panel board bus bar, to a voltage suitable for powering the controller 108 and the data transceiver 110, for example 5 VDC.

Figure 4:
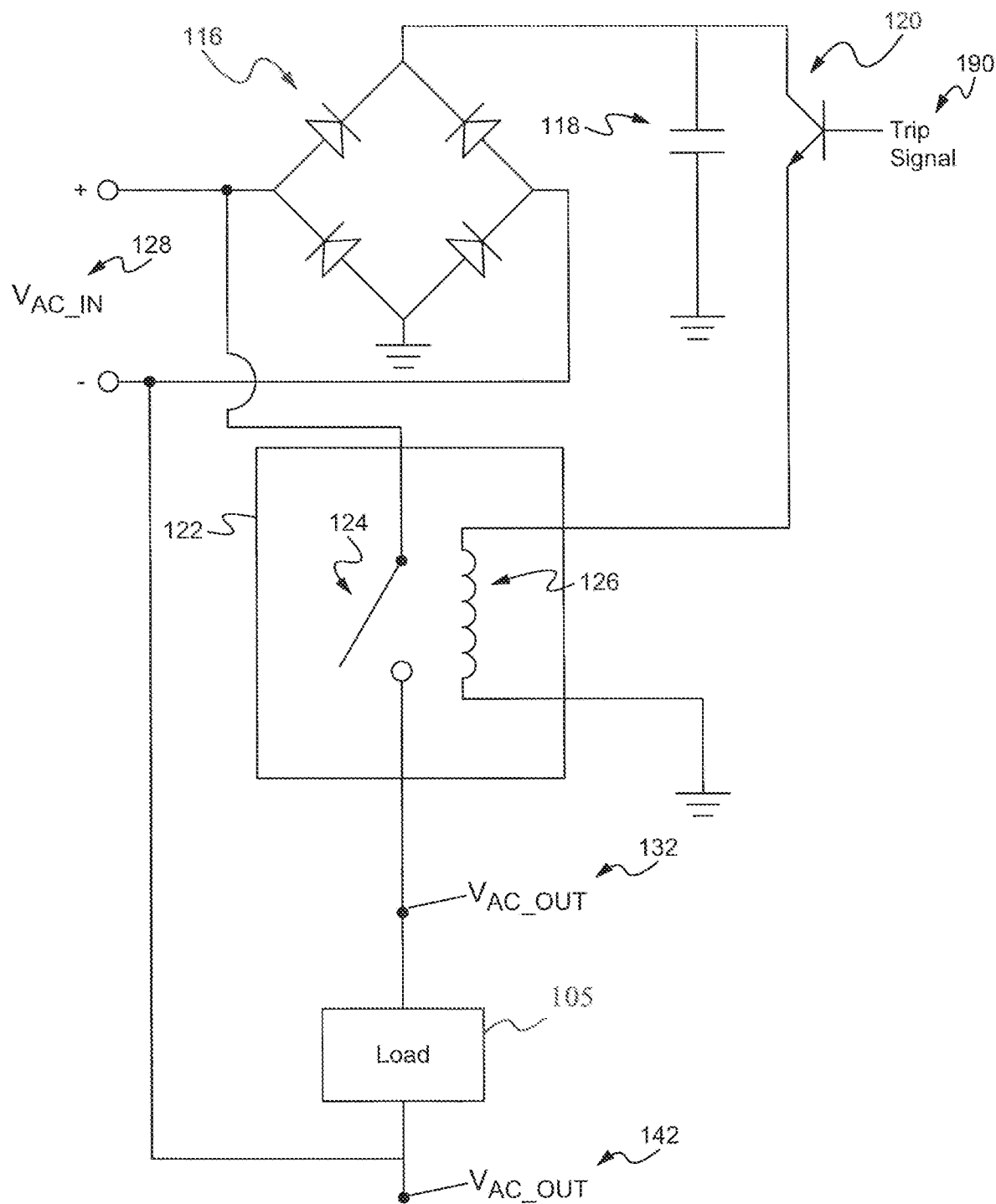
FIG. 4 illustrates a schematic circuit diagram of the toggle switch according to some embodiments.

FIG. 4 illustrates a schematic circuit diagram of the toggle switch 102 according to some embodiments. The toggle switch 102 includes a bridge rectifier 116, a capacitor 118, a transistor 120, and an electro-mechanical switch 122. In some embodiments, the transistor 120 is an IGBT. In other embodiments, the transistor 120 is a FET. It is understood that other types of transistors can be used. The electro-mechanical switch 122 includes a physical switch 124 and an inductor coil 126. In some embodiments, a movable switching arm of the physical switch 122 is spring-loaded so as to be open in an unforced state, and the physical switch 122 includes a magnet attached to the movable switching arm, or the switching arm itself is magnetic. A driving signal, Vtrip signal 190, is provided to the transistor 120 from the controller 108. When the driving signal to the transistor 120 is high, the transistor 120 turns ON, which results in current flow through the transistor 120 and the inductor coil 126. Current flow through the inductor coil 126 results in a magnetic field that forces the physical switch 124 closed. Under normal operating conditions, the driving signal provided to the transistor 120 is high, which results in the transistor 120 ON, and the physical switch 124 closed. With the physical switch 124 closed, input voltage Vac_in 128 received from the panel board bus bar is passed through and output as Vac_out 132, which is provided as input to a Load 105 comprising the current limiting circuit 104 and current sensing circuit 106. When the driving signal to the transistor 120 is low, the transistor 120 turns OFF, which results in no current flow through the transistor 120 and the inductor coil 126. With no current flow through the inductor coil 126, there is no magnetic field holding the physical switch 124 closed, and the spring action of the physical switch 124 moves the switching arm to its open, unforced state. When the physical switch 124 is open, no current flows through the electro-mechanical switch 122. In this state, the electro-mechanical switch 122 is considered "tripped". The toggle switch 102 includes the lever attached to the electro-mechanical switch 122. The lever functions as both a visual indicator that the physical switch is open or closed based on the lever position and provides user interface control for manually flipping the physical switch 124 open or closed.

Figure 5:
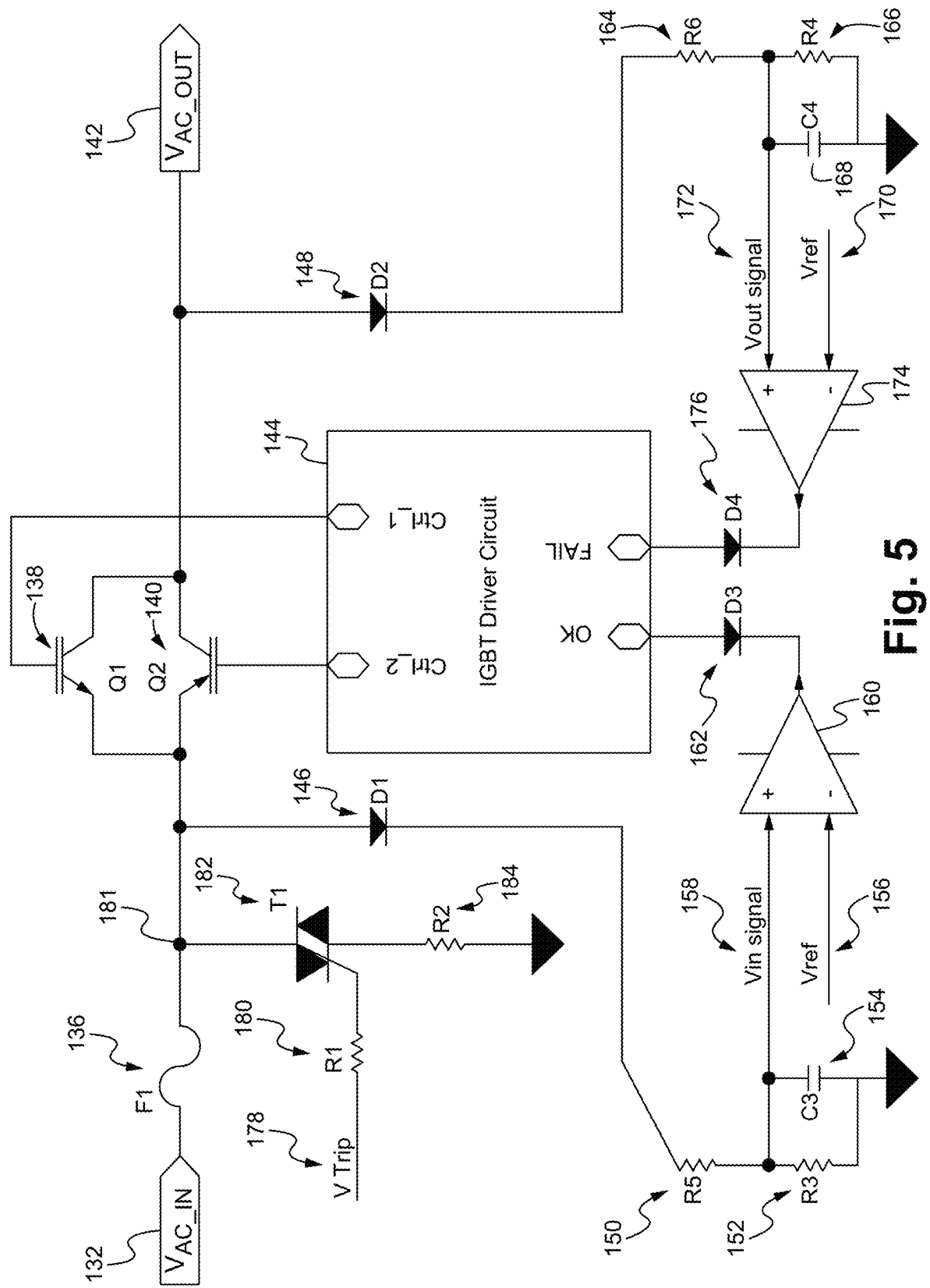
FIG. 5 illustrates a schematic circuit diagram of the current sensing circuit and the current limiting circuit according to some embodiments.

FIG. 5 illustrates a schematic circuit diagram of the current sensing circuit 104 and the current limiting circuit 106 according to some embodiments. The circuit includes a fuse 136, a transistor 138, a transistor 140, a driver circuit 144, a diode 146, a diode 148, a resistor 150, a resistor 152, a capacitor 154, a comparator 160, a diode 162, a resistor 164, a resistor 166, a capacitor 168, a comparator 174, a diode 176, a resistor 180, a triac 182, and a resistor 184. The resistor 180, the triac 182, and the resistor 184 comprise the current limiting circuit 106 (FIG. 3). The transistor 138, the transistor 140, the driver circuit 144, the diode 146, the diode 148, the resistor 150, the resistor 152, the capacitor 154, the comparator 160, the diode 162, the resistor 164, the resistor 166, the capacitor 168, the comparator 174, and the diode 176 comprise the current sensing circuit 104 (FIG. 3). In some embodiments, the transistor 138 and the transistor 140 are each IGBTs. In other embodiments, the transistor 138 and the transistor 140 are each FETs. It is understood that other types of transistors can be used. The driver circuit 144 is coupled to each of the transistors 138, 140 and provides driving signals for turning each of the transistors 138, 140 ON and OFF using control signal ctrl_1 and control signal ctrl_2, respectively.

In operation, the circuit (FIG. 5) receives an input voltage Vac_in 132 and outputs voltage Vac_out 142. The input voltage Vac_in 132 is the voltage output from the electro-mechanical switch 122 (FIG. 4). During a positive half-cycle of Vac_in 132, the transistor 138 is ON and the transistor 140 is OFF, and during a negative half-cycle of Vac_in 132, the transistor 138 is OFF and the transistor 140 is ON, thereby enabling uninterrupted current flow from Vac_in 132 to Vac_out 142. The comparator 160 outputs a voltage representing a difference between the Vin_signal 158 and a reference voltage Vref 156. The difference voltage output form the comparator 160 is input to the OK pin of the driver circuit 144. The comparator 174 outputs a voltage representing a difference between the Vout_signal 172 and a reference voltage Vref 170. The difference voltage output form the comparator 174 is input to the FAIL pin of the driver circuit 144. In some embodiments, the reference voltage Vref 156 and the reference voltage Vref 170 are the same voltage value. If the difference voltage input at the OK pin is within a first acceptable range and the difference voltage input at the FAIL pin is within a second acceptable range, then the circuit operates as normal where during the positive half-cycle of Vac_in 132, the transistor 138 is ON and the transistor 140 is OFF, and during a negative half-cycle of Vac_in 132, the transistor 138 is OFF and the transistor 140 is ON. If the difference voltage input at the OK pin is not within the first acceptable range or the difference voltage input at the FAIL pin is not within the second acceptable range, then the driver circuit 144 turns OFF the transistors 138 and 140, essentially tripping the circuit breaker and preventing current flow.

The current limiting circuit functions to limit the current flowing through the current path including diode 146, resistors 150, 152, and capacitor 154 in response to receiving a Vtrip signal 178. The Vtrip signal 178 enables the triac 182 to shunt current from this current path. Shunting current through the triac 182 drops the voltage at node 181 which also drops the voltage level of Vin_signal 158 and Vout_signal 172. The resulting change in the difference signals output from the comparators 160 and 174 leads to the driver circuit 144 turning OFF the transistors 138 and 140. In this manner, the current limiting circuit functions as a catalyst for turning OFF transistors 138 and 140, and the current sensing circuit that includes the driver circuit 144 and transistors 138, 140 functions as a solid state circuit breaker.

Figure 6:
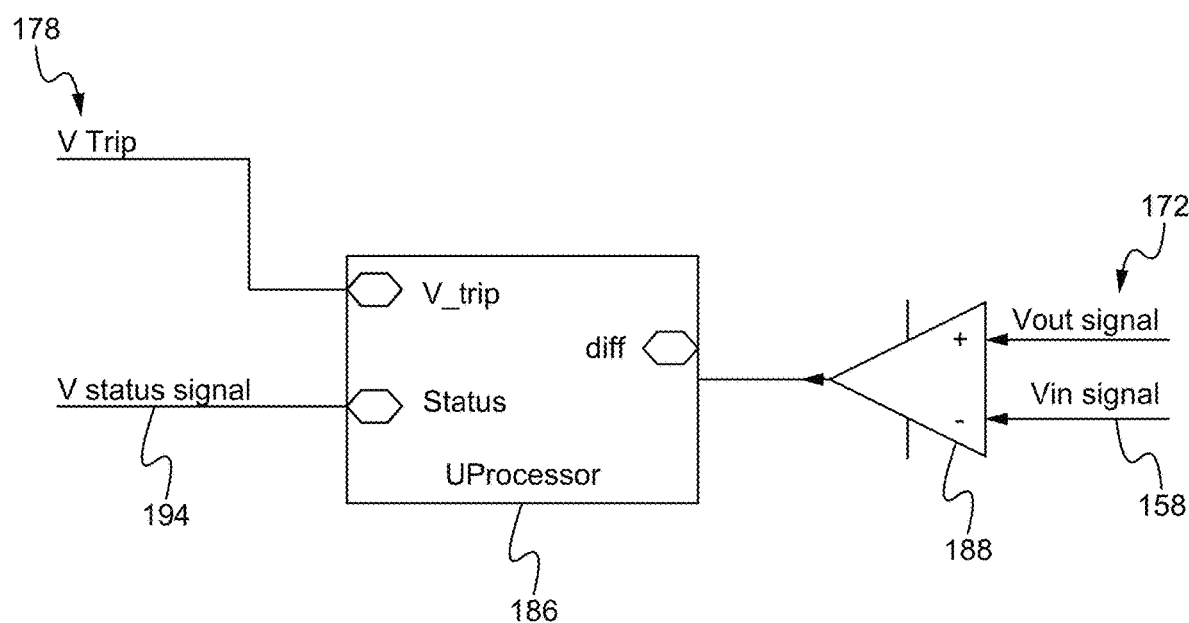
FIG. 6 illustrates a schematic circuit diagram of the controller according to some embodiments.

FIG. 6 illustrates a schematic circuit diagram of the controller 108 according to some embodiments. The controller 108 includes a microprocessor 186 and a comparator 188. The comparator 188 receives as input the Vout_signal 172 and the Vin_signal 158. The voltage difference between the Vout_signal 172 and the Vin_signal 158 is input to the microprocessor 186 at diff pin. If the voltage difference between Vout_signal 172 and Vin_signal 158 exceed a threshold value, then the microprocessor 186 determines a fail condition exists and in response generates a Vtrip signal 178 which is sent out via the V_trip pin. The microprocessor 186 is also configured to receive as input a Vstatus signal 194 via the Status pin. The Vstatus signal 194 can be a signal received from the data transceiver 110 (FIG. 3). The Vstatus signal 194 also can be received from other sources, for example a temperature sensor included within the solid state circuit breaker. The Status pin, or another pin, on the microprocessor 186 can also be used for sending energy management data to the data transceiver 110 for transmission to a remote device. In some embodiments, the solid state circuit breaker is configured with remote control functionality. In this case, remote control signaling can be received by the data transceiver 110 and sent to the controller 108 for processing. One such remote control signal includes a circuit breaker turn OFF signal. When the Vstatus signal 194 received by the microprocessor 186 is the circuit breaker turn OFF signal, the microprocessor 186 generates the Vtrip signal 178, regardless of the differential voltage output from the comparator 188. The Vtrip signal 178 is sent to the current limiting circuit to control the triac 182 (FIG. 5) and to turn OFF the transistor 120 (FIG. 4) using Vtrip signal 190, which is an inverted signal of Vtrip signal 178.

The Vtrip signal sent by microprocessor 186 is sent to both the current limiting circuitry of solid state circuit portion (FIG. 5) and the physical toggle switch 102. In actuality, the Vtrip signal is either high or low. The Vtrip signal is applied to the triac 182, when Vtrip signal is low no current flows through the triac 182. When Vtrip signal 178 is high, current flows through the triac 182 thereby reducing voltage at node 181. As such, under normal operating conditions, the Vtrip signal 178 is low, no current flows through the triac 182, and the transistors 138 and 140 are ON enabling current flow from Vac_in 132 to Vac_out 142. As applied to the physical toggle switch 102, the Vtrip signal 178 is inverted, and the inverted Vtrip signal 190 is supplied as a driving signal for the transistor 120. When the inverted Vtrip signal 190 is high, corresponding to the Vtrip signal 178 low, the transistor 120 is ON resulting in current flow through the inductor coil 126 which maintains the switch 124 closed. As such, under normal operating conditions, the Vtrip signal 178 is low, the inverted Vtrip signal 190 is high, and the switch 124 is closed enabling current flow through the electro-mechanical switch 122.

The Vtrip signal 178 is generated in response to one or more conditions to result in Vac_in 132 and/or Vac_out 142 changing to values that are outside normal operating values. Such conditions include, but are not limited to, over current or over voltage conditions on either the line side or the load side of the circuit. By way of example, suppose a short circuit occurs in one of the output circuits (FIG. 2), this results in a voltage drop at Vac_out 142. If Vac_out 142 drops low enough relative to the reference value Vref 170, the comparator 174 outputs a voltage difference level that indicates a fail condition. In response to the fail condition, the driver circuit 144 generates driver signal crtl_1 that turns OFF transistor 138 and driver signal ctrl_2 that turns OFF transistor 140, which essentially "trips" the circuit breaker by turning off current flow through transistors 138, 140. In this state, the driver circuit 144 functions as a latch which keeps the circuit open until the circuit breaker is reset. For redundancy, the controller 108 (FIG. 6) also determines fail conditions. In particular, the comparator 188 compares Vac_out 142 to Vac_in 132 and if the difference is outside an acceptable range, then the microprocessor 186 determines that a fail condition exists. In response to determining a fail condition exists, the microprocessor 186 generates the Vtrip signal 178 to trip the circuit breaker. In the case of a short circuit in one of the output circuits, if the voltage drop at Vac_out 142 drops enough relative to Vac_in, the comparator 188 outputs a voltage difference level that indicates a fail condition, which results in the microprocessor 186 generating the Vtrip signal 178. The Vtrip signal 178 controls the triac 182 to draw current, which reduces the voltage at the node 181. This voltage drop is input as Vin_signal 158 to the comparator 160. The voltage drop is sufficient such that the comparison between Vin_signal 158 and Vref, results in voltage level output by the comparator 160 that represents a fail condition. In response to the fail condition, the driver circuit 144 generates driving signal crtl_1 that turns OFF transistor 138 and driving signal ctrl_2 that turns OFF transistor 140. In this manner, a short circuit condition on the load side of the circuit breaker (at Vac_out 142) results in a solid state tripping of the circuit breaker by turning OFF the transistors 138, 140 either in response to the fail condition resulting from the comparison at comparator 174 or the comparison at the comparator 188. The redundancy of the current sensing circuitry, including the comparators 160 and 174, provides alternative means for tripping the circuit breaker in case the controller 108 fails to detect a fail condition and generate a corresponding Vtrip signal. In some embodiments, the driver circuit 144 is configured as a "dumb" circuit that parametrically, without control of a separate control circuit, sends turn OFF driving signals, crtl_1 and crtl_2, to the transistors 138, 140 in response to specific input voltage levels at OK pin (voltage level corresponding to output of comparator 160) and/or FAIL pin (voltage level corresponding to output of comparator 174). In other words, the driver circuit 144 can be configured without a separate control circuit, programmable logic circuit, or the like. Alternatively, the driver circuit 144 can be configured to include a control circuit having programmable logic configured to interpret the voltage levels input at OK pin and FAIL pin and determine corresponding driving signals to be sent to the transistors 138, 140.

As described above, multiple different mechanisms are in place to trip the solid state circuit breaker. A first mechanism is for the microprocessor 186 to determine if a difference between the Vout signal 172 and the Vin signal 158, as compared by the comparator 188, is sufficient to meet a fail condition, thereby generating the Vtrip signal 178. The difference signal can indicate a fail condition due to either an undesirable condition on the line side (input side at Vac_in 132) or the load side (output side at Vac_out 142). For example, the instantaneous voltage level at Vac_out 142 may unexpectedly change due to a short circuit on the load side or the instantaneous voltage level at Vac_in 132 may unexpectedly change due to a voltage or current surge on the line side. Either change results in an instantaneous difference between the Vout signal 172 and the Vin signal 158 that leads to a determined fail condition. Generation of the Vtrip signal 178 results in tripping the solid state circuit breaker by both turning OFF the transistors 138 and 140 (FIG. 5) and opening the electro-mechanical switch 122 (FIG. 4) by turning OFF the transistor 120. This first mechanism provides both a solid state solution (turning OFF transistors 138 and 140) and a physical switch solution (opening the electro-mechanical switch 122) for tripping the solid state circuit breaker. A second mechanism to trip the solid state circuit breaker is for the driver circuit 144 to send turn OFF driving signals to the transistors 138 and 140 in response to either a difference signal output from the comparator 160 being outside the first acceptable range, e.g. defined threshold values, or a difference signal output from the comparator 174 being outside the second acceptable range, e.g. other defined threshold values. For example, the instantaneous voltage level at Vac_out 142 may unexpectedly change due to a short circuit on the load side. This change results in a difference signal output from the comparator 174 that is outside the second acceptable range, in which case the driver circuit 144 sends turn OFF driving signals to the transistors 138 and 140. In another example, the instantaneous voltage level at Vac_in 132 may unexpectedly change due to a voltage or current surge on the line side. This change results in a difference signal output from the comparator 160 that is outside the first acceptable range, in which case the driver circuit 144 sends turn OFF driving signals to the transistors 138 and 140. This second mechanism provides a solid state solution for tripping the solid state breaker. A third mechanism to trip the solid state circuit breaker builds on the second mechanism. In addition to the driver circuit 144 sending turn OFF driving signals to the transistors 138 and 140, the microprocessor 184 determines a fail condition via comparator 188 based on similar change(s) in Vac_in 132 and/or Vac_out 142. In this third mechanism, the current sensing circuitry first determines a fail condition and turns OFF transistors 138, 140 accordingly, followed by the microprocessor 186 determining a fail condition and generating the Vtrip signal 178, which functions to both trip the electro-mechanical switch 122 and provide current limiting signaling to the current limiting circuit for redundancy in turning OFF the transistors 138, 140. In some embodiments, the circuit breaker is reset by physically flipping the physical switch 124 back to the ON (closed) position, which powers ON the driver circuit 144 to drive the transistors 138, 140 according to normal operation, presuming the fault condition that led to tripping the circuit breaker is no longer present.

The controller 108 includes programmable logic and circuitry for implementing programmed instructions. Part of the programmed instructions includes state transition tables. FIGS. 7A-7C illustrate a state transition table according to some embodiments. The state transition table shown in FIGS. 7A-7C is directed to a solid state circuit breaker configured to include remote control functionality where remote control signals are received by the controller 108 from an external control device via the data transceiver 110. The state transition table shows the event(s) and related action that occur when transitioning from a current state to a next state of the solid state circuit breaker. The far left column of the state transistor table lists possible current states, and the top row lists possible next states. The state transition table defines a finite state machine for the solid state circuit breaker. The state transition table maps the possible transitions between states in the state machine. Since in some cases several events can transition a given state to another, a tabular approach is used. In addition to states, other objects in this state transition table include events (inputs that trigger a transition from one state to another) and actions (outputs that enable the transition from said state to another). The below explains formatting of these tables and their objects in more detail, for ease of readability. Rows indicate current state, columns indicate next state. The intersection between a given row's state and a column's state is the placeholder for these states' transition (if any). A hyphen (-) on the intersection between a current and next state means it is an impossible transition. Brackets ([ ]) in the intersections indicate events. If there can be more than one event type that triggers a transition between any two states, then multiple brackets will be separated by the word "or". Parentheses (( )) in the intersections indicate actions as a result of events. Abbreviations in the state transition table: CB stands for circuit breaker, MC stands for microcontroller (controller), TM stands for transmitter (data transceiver), EM stands for energy monitoring, OV stands for over voltage, OC stands for over current, and OT stands for over temperature. In some embodiments, the solid state circuit breaker includes a temperature sensor, and the sensed data from the temperature sensor is input to the microprocessor 186. The temperature data is used by the microprocessor to determine the over temperature condition. In the exemplary state transition table shown in FIGS. 7A-7C, there are seven different states: 1) S01A: power path ON, energy monitoring OFF 2) S01B: power path ON, energy monitoring ON 3) S02A: circuit breaker (CB) OFF 4) S03A: diagnostic test mode 1 5) S03B: diagnostic test mode 2 6) S04A: system error 1 7) S04B: system error 2. It is understood that additional states can be implemented. The terminology "power path" refers to the circuit path, including the physical switch within the switch 102, for input power to be passed through and output the solid state circuit breaker. Power path ON refers to the physical switch being closed, and power path OFF refers to the physical switch being open. The terminology "energy monitoring" refers to sensed data, including sensed voltage, current, and temperature data, within the solid state circuit breaker. Energy monitoring ON refers to transmitting the sensed data via the data transceiver 110 to the remote device/user to determine actions to be taken, for example turning the solid state circuit breaker ON or OFF. Energy monitoring OFF refers to not transmitting the sensed data to the remote device/user.

For example, the current state is S01B where everything is ON, which corresponds to power path ON and energy monitoring ON. To transition from the state S01A to a state where everything is OFF, which corresponds to state S02A, there are three different events that can occur to trigger this state transition. These three different events, as indicated in the brackets ([ ]), are a user physically or remotely turns power path OFF, OV/short circuit/OC causes trip via hard circuit (driver circuit) by FET or IGBT, or OT causes microprocessor to turn power path OFF. The corresponding action taken due to one of these three events is that the power path changes from ON to OFF, and the corresponding change of state is from power path ON to power path OFF.

Remote control functionality is an optional function implemented by the solid state circuit breaker. In those configurations where remote control function is not included, the state transition table is altered to eliminate events corresponding to such remote control. For example, in the example describe above where the state is changed from S01B to S02A, the first event for triggering such action no longer includes a user remotely turning power path OFF, but instead simply includes a user physically turning power path OFF. Without remote control functionality, there also may not be a need for certain states, for example the states S01A and S04B are unused. FIGS. 8A-8C illustrates another state transition table according to some embodiments. The state transition table shown in FIGS. 8A-8C is similar to that shown in FIGS. 7A-7C except the solid state circuit breaker does not include remote control functionality. As such, those events corresponding to remote control functionality are not included in the state transition table of FIGS. 8A-8C, and the states S01A and S04B are unused.

The present application has been described in terms of specific embodiments incorporating details to facilitate the understanding of the principles of construction and operation of the solid state circuit breaker. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A circuit breaker including a first terminal to receive an AC voltage and a second terminal to output the AC voltage, the circuit breaker comprising:
    an electro-mechanical switch coupled to the first terminal to receive the AC voltage, wherein the electro-mechanical switch includes a physical switch that moves between an open position and a closed position, and an actuator for moving the physical switch between the open position and the closed position;
    a solid state circuit breaker coupled to the electro-mechanical switch to receive the AC voltage, the solid state circuit breaker comprising an output, a coupled transistor pair, and a sensing circuit coupled to the coupled transistor pair, wherein the sensing circuit is configured to turn OFF the coupled transistor pair in response to receiving a trip signal; and
    a controller circuit coupled to an input and an output of the solid state circuit breaker, wherein the controller circuit is configured to determine a fault condition at either the input or the output of the solid state circuit breaker, and in response to the fault condition, generate the trip signal and send the trip signal to the solid state circuit breaker and to the actuator, and wherein the physical switch is moved to the open position by the actuator in response to reception of the trip signal by the actuator,
    wherein the solid state circuit breaker is controlled separately by the trip signal and by the output of the solid state circuit breaker independent of the controller.

2. The circuit breaker of claim 1, wherein the solid state circuit breaker comprises:
    a current limiting circuit activated by the trip signal;
    the coupled transistor pair coupled to the current limiting circuit;
    a driver circuit coupled to the coupled transistor pair; and
    the sensing circuit coupled to the current limiting circuit and the driver circuit, wherein the sensing circuit is configured to sense a voltage drop in response to activation of the current limiting circuit, and wherein the driver circuit is configured to turn OFF the coupled transistor pair in response to the sensed voltage drop.

3. The circuit breaker of claim 2, wherein the controller circuit is further coupled to the current limiting circuit, and wherein the current limiting circuit shunts current in response to receiving the trip signal, thereby resulting in the voltage drop sensed by the sensing circuit.

4. The circuit breaker of claim 3, wherein the sensing circuit is further configured to sense the fault condition at either the input or the output of the solid state circuit breaker and to supply the fault condition to the driver circuit.

5. The circuit breaker of claim 4, wherein the controller circuit, the current limiting circuit, the sensing circuit, and the driver circuit provide a first mechanism for turning OFF the coupled transistor pair in response to the fault condition.

6. The circuit breaker of claim 5, wherein the sensing circuit and the driver circuit provide a second mechanism independent of the current limiting circuit and the controller circuit for turning OFF the coupled transistor pair in response to the fault condition.

7. The circuit breaker of claim 6, wherein the first mechanism and the second mechanism provide redundancy within the solid state circuit breaker for turning OFF the coupled transistor pair in response to the fault condition.

8. The circuit breaker of claim 2, wherein the current limiting circuit comprises a triac controlled by the trip signal.

9. The circuit breaker of claim 1, wherein the electro-mechanical switch and the solid state circuit breaker provide redundancy within the circuit breaker for turning OFF current flow through the circuit breaker in response to the fault condition.

10. The circuit breaker of claim 1, wherein the sensing circuit comprises:
    a first comparator coupled to the first terminal and configured to output a first voltage difference corresponding to a first voltage characteristic; and
    a second comparator coupled to the second terminal and configured to output a second voltage difference corresponding to a second voltage characteristic.

11. The circuit breaker of claim 1, wherein the controller circuit is further configured to:
    receive as input a remote control signal for turning OFF the solid state circuit breaker; and
    generate the trip signal in response to the remote control signal.

12. The circuit breaker of claim 1, wherein a first transistor of the coupled transistor pair is configured to enable current flow from the first terminal to the second terminal during a positive half-cycle of the AC voltage, and wherein a second transistor of the coupled transistor pair is configured to enable current flow from the first terminal to the second terminal during a negative half-cycle of the AC voltage.

13. A circuit breaker including a first terminal to receive an AC voltage and a second terminal to output the AC voltage, the circuit breaker comprising:
    an electro-mechanical switch coupled to the first terminal to receive the AC voltage, wherein the electro-mechanical switch includes a physical switch that moves between an open position and a closed position, and an actuator for moving the physical switch between the open position and the closed position;
    a solid state circuit breaker coupled to the electro-mechanical switch to receive the AC voltage, the solid state circuit breaker comprising an output, a coupled transistor pair, a current limiting circuit activated by a trip signal, and a sensing circuit coupled to the coupled transistor pair, wherein the sensing circuit is configured to turn OFF the coupled transistor pair in response to receiving the trip signal, and the current limiting circuit is configured to drop the voltage into the solid state circuit breaker in response to receiving the trip signal; and
    a controller circuit coupled to an input and an output of the solid state circuit breaker, wherein the controller circuit is configured to determine a fault condition at either the input or the output of the solid state circuit breaker, and in response to the fault condition, generate the trip signal and send the trip signal to the solid state circuit breaker and to the actuator, and wherein the physical switch is moved to the open position by the actuator in response to reception of the trip signal by the actuator.

14. The circuit breaker of claim 13, wherein the current limiting circuit shunts the voltage into the solid state circuit breaker to ground in response to receiving the trip signal.

\* \* \* \* \*